United States Patent [19]

Taylor

[11] 3,928,352

[45] Dec. 23, 1975

[54] CERTAIN SUBSTITUTED 2-PYRAZINEMETHANOLS

[75] Inventor: Harold M. Taylor, Indianapolis, Ind.

[73] Assignee: Eli Lilly and Company, Indianapolis, Ind.

[22] Filed: May 7, 1974

[21] Appl. No.: 467,708

[52] U.S. Cl. .......... 260/250 B; 71/92; 260/250 BN; 424/250
[51] Int. Cl.² ............. C07D 241/12; C07D 241/18; C07D 241/16
[58] Field of Search .................. 260/250 B, 250 BN

[56] References Cited
UNITED STATES PATENTS 3,452,016  6/1969  Horne ............................ 260/250 B
3,544,682  12/1970  Taylor et al ..................... 260/250 B

*Primary Examiner*—Richard J. Gallagher
*Attorney, Agent, or Firm*—Joseph A. Jones; Everet F. Smith

[57] ABSTRACT

A new series of 2-pyrazinemethanols useful for the protection of plants from microbial diseases has been discovered. The new compounds are characterized by alkyl, cycloalkyl or phenyl substituents on the α-carbon and by a single additional substituent on the pyrazine ring. Many of the compounds are additionally useful for the inhibition of plant growth.

6 Claims, No Drawings

CERTAIN SUBSTITUTED 2-PYRAZINEMETHANOLS

BACKGROUND OF THE INVENTION

It is well known in agricultural chemistry that all useful plants suffer from microbial diseases, such as powdery mildew, downy mildew, verticillium wilt, botrytis infections, bean rust, rice blast and the like. Virtually every time that crop or ornamental plants are planted, the danger of loss or injury of the plants due to a microbial disease is present. Antimicrobial agents are frequently used to kill or inhibit the causative organisms of plant diseases.

Agents for the inhibition of plant growth are relatively new in agricultural chemistry, but are coming into use at the present time. Such agents cause the treated plant to assume a shorter, stockier growth habit than is normal for the species. The shorter plant is sturdier and less likely to be injured by rain or wind, and is frequently easier to harvest by machine than is the normal, taller plant. In the case of ornamentals, the stockier plant is more attractive, since it has a relatively greater mass of bloom compared to the size of the plant.

Further, plant growth inhibitors can be used to stunt the growth of undesirable weeds, particularly aquatic weeds, thereby reducing both the amount of nutrients taken from the soil or water by the weeds, and the mass of weed foliage present in the treated area.

The prior art which is somewhat related to this invention includes Taylor et al., U.S. Pat. No. 3,544,682, which discloses fungicidal 2-pyrazinemethanols, and Belgian Patent 714,003, which discloses 5-pyrimidinemethanols. Both disclosures are clearly distinguished from the present invention by the absence of any substituent on their diazine rings other than the substituted-methanol group.

The following references disclose fungicidal or plant growth-inhibiting pyrazines having a degree of relationship to the present invention.

Gysin, Canadian Patent 610,487
Geronimo, U.S. Pat. No. 3,539,332
Akkerman, Netherlands Patent 105,432, *C.A.* 62, 6495b (1965).

SUMMARY

The new compounds of this invention are represented by the formula

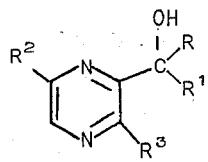

wherein
R represents $C_2$–$C_8$ alkyl, $C_3$–$C_8$ cycloalkyl, phenyl, or phenyl mono- or disubstituted with fluoro, chloro, bromo, methyl, ethyl, trifluoromethyl, or methoxy;
$R^1$ represents $C_2$–$C_8$ alkyl, phenyl, or phenyl mono- or disubstituted with fluoro, chloro, bromo, methyl, ethyl, trifluoromethyl, or methoxy;
$R^2$ represents hydrogen, iodo, methyl, ethyl, methoxy, or methylthio;
$R^3$ represents hydrogen, iodo, methyl, ethyl, methoxy, methylthio, or dimethylamino;
provided that one of $R^2$ and $R^3$, but not both, represents hydrogen; and that both R and $R^1$ represent phenyl or substituted phenyl when $R^3$ represents a group other than hydrogen.

The compounds are useful for the protection of plants from microbial diseases, and many of the compounds are also useful for plant growth inhibition.

DESCRIPTION OF THE PREFERRED EMBODIMENT

In the above formula, the general chemical terms are used in their usual meanings. The term $C_2$–$C_8$ alkyl represents groups such as ethyl, isopropyl, tertiary butyl, neopentyl, normal pentyl, 1-propylbutyl, 2,5-dimethylhexyl, and normal octyl. The term $C_3$–$C_8$ cycloalkyl represents groups such as cyclopropyl, cyclobutyl, cyclohexyl, and cyclooctyl.

All of the compounds of this invention can be used for the protection of plants from microbial diseases. The compounds which can also be used to inhibit plant growth are those wherein no more than one of R and $R^1$ represents alkyl, $R^2$ is as described above, and $R^3$ represents hydrogen.

A group of exemplary compounds of this invention are presented below to assist those skilled in the art in understanding the scope of the invention. The named compounds should not be construed as limiting the invention in any way.

α-cyclobutyl-α-ethyl-6-iodo-2-pyrazinemethanol
α-(4-bromophenyl)-3-methylthio-α-phenyl-2-pyrazinemethanol
α-butyl-α-(3-methylpentyl)-6-methoxy-2-pyrazinemethanol
α-(1-ethylpropyl)-α-(3-flurophenyl)-6-methyl-2-pyrazinemethanol
α-butyl-6-ethyl-α-hexyl-2-pyrazinemethanol
α-(3-methylpentyl)-6-iodo-α-(o-tolyl)-2-pyrazinemethanol
α-(1-ethylpentyl)-6-methoxy-α-(3-methoxyphenyl)-2-pyrazinemethanol
6-methoxy-α,α-dioctyl-2-pyrazinemethanol
α-cyclopropyl-6-ethyl-α-(3,5-difluorophenyl)-2-pyrazinemethanol
α-cyclobutyl-6-methylthio-α-(2,4-xylyl)-2-pyrazinemethanol
α-cyclohexyl-6-iodo-α-isopropyl-2-pyrazinemethanol
α-hexyl-6-iodo-α-phenyl-2-pyrazinemethanol
α-(2,4-dibromophenyl)-α-(3-fluorophenyl)-3-methoxy-2-pyrazinemethanol
α-(4-chlorophenyl)-α-cyclopropyl-6-methyl-2-pyrazinemethanol
α-(2-bromophenyl)-α-(3,5-dimethoxyphenyl)-3-methylthio-2-pyrazinemethanol
α-ethyl-6-methyl-α-(p-tolyl)-2-pyrazinemethanol
α-(2-bromophenyl)-α-(3-ethylphenyl)-3-dimethylamino-2-pyrazinemethanol
α-cyclohexyl-α-(4-methoxyphenyl)-6-methylthio-2-pyrazinemethanol
6-ethyl-α-(3,4-difluorophenyl)-α-(4-fluoro-2-methylphenyl)-2-pyrazinemethanol
α-(2,4-dibromophenyl)-α-(1-ethylpentyl)-6-iodo-2-pyrazinemethanol
α-(3-chloro-5-methoxyphenyl)-3-methoxy-α-(3,5-xylyl)-2-pyrazinemethanol α-(2-ethylphenyl)-3-methoxy-α-(2,4-dimethoxyphenyl)-2-pyrazinemethanol α-(1-ethylpropyl)-α-(2-fluoro-5-methylphenyl)-6-methylthio-2-pyrazinemethanol α-(4-chlorophenyl)-α-(2-chloro-4-methoxyphenyl)-3-ethyl-2-pyrazinemethanol The preferred compounds of this invention are α-(2-chlorophenyl)-α-cyclohexyl-6-methoxy-2-pyrazinemethanol, α-(2,4-dichlorophenyl)-6-methoxy-α-phenyl-2-pyrazinemethanol, α-(4-bromophenyl)-6-methoxy-α-propyl-2-pyrazinemethanol, α-(2,4-dichlorophenyl)-6-methyl-α-phenyl-2-pyrazinemethanol, and α-(2,4-dichlorophenyl)-3-iodo-α-phenyl-2-pyrazinemethanol.

The new compounds are made by reacting a 2-iodopyrazine, bearing an appropriate 3- or 6-substituent, with a ketone in the presence of n-butyllithium at very low temperatures. The oxo carbon of the ketone becomes the α-carbon of the 2-pyrazinemethanol, and the two substituents of the ketone are the R and $R^1$ substituents of the desired compound.

All of the ketones needed to make the new compounds are obtainable or readily made by the processes known to those skilled in the art.

The intermediate iodopyrazines are easily made by known processes, such as those taught by Hirschberg et al., The Synthesis and Properties of Iodopyrazines, *J. Org. Chem.* 26, 1907–1912 (1961). In general, the intermediates are synthesized by replacing chlorine with iodine by reaction with sodium iodide in the presence of hydriodic acid. The 3- and 6-substituents other than iodo, such as methoxy, methylthio and dimethylamino are added to the pyrazine ring by replacing a 3- or 6-iodo substituent with the desired substituent, as by reaction with sodium methoxide, methanethiol, or dimethylamine respectively.

The following example illustrates the synthesis of 2-iodopyrazine intermediates having a 3- or 6-substituent other than iodo.

EXAMPLE 1

2-iodo-6-methylthiopyrazine

A methanol solution containing 9.6 g. of methanethiol was prepared, and to it was added a methanol solution of 8.15 g. of sodium methoxide. The combined solution was added to a solution of 50 g. of 2,6-diiodopyrazine in methanol, and the mixture was stirred for two hours at room temperature. The crude product was precipitated by diluting the reaction mixture with water, and 35 g. of dried solids was collected. After recrystallization from methylene chloride-hexane, the product was identified as 2-iodo-6-methylthiopyrazine by elemental microanalysis and nuclear magnetic resonance analysis.

The following example illustrates the synthesis of the new compounds.

EXAMPLE 2

6-iodo-α-isobutyl-α-(o-tolyl)-2-pyrazinemethanol

A 10 g. portion of 2,6-diiodopyrazine and 5.8 g. of isobutyl (o-tolyl) ketone was dissolved in 100 ml. of anhydrous ethyl ether, and the flask was flushed with nitrogen. The reaction mixture was cooled to about −80°C., and 2.2 g. of n-butyllithium in hexane solution was added dropwise with stirring over a period of about 30 minutes. The mixture was stirred in the cold for 30 minutes more after the addition, and was then allowed to warm to room temperature. Stirring was continued for 16 hours. Then, the excess butyllithium was hydrolyzed by the addition of saturated ammonium chloride solution, and the organic layer was separated. After washing, first with water and then with saturated sodium chloride solution, the organic layer was dried over magnesium sulfate and evaporated under vacuum to produce an oily residue. The residue was taken up in benzene and chromatographed on a silica gel column, eluting with increasing proportions of ethyl acetate in benzene. The product-containing fractions were combined and evaporated under vacuum to produce a pale yellow oil, which was identified by elemental microanalysis and nuclear magnetic resonance analysis as 6-iodo-α-isobutyl-α-(o-tolyl)-2-pyrazinemethanol.

The above exemplary processes are used to produce all the compounds of this invention. Only minor variations in the processes, easily supplied by an organic chemist, are needed for production of different compounds.

The following compounds, made by the processes above, are further exemplary of the invention.

EXAMPLE 3

α-cyclopropyl-α-(4-methoxyphenyl)-6-methylthio-2-pyrazinemethanol, m.p. 127°–130°C.

EXAMPLE 4

α-ethyl-α-(3-fluorophenyl)-6-methylthio-2-pyrazinemethanol, oil.

EXAMPLE 5

α-butyl-α-(4-trifluoromethylphenyl)-6-iodo-2-pyrazinemethanol, oil

EXAMPLE 6

α-(2-chlorophenyl)-α-cyclohexyl-6-methoxy-2-pyrazinemethanol, glass

EXAMPLE 7

α-cyclohexyl-6-iodo-α-isopropyl-2-pyrazinemethanol, oil

EXAMPLE 8

α-(2,4-dichlorophenyl)-6-methoxy-α-phenyl-2-pyrazinemethanol, m.p. 101°–104°C.

EXAMPLE 9

α-(2,4-dichlorophenyl)-6-iodo-α-phenyl-2-pyrazinemethanol, glass

EXAMPLE 10

α-cyclopropyl-α-(4-methoxyphenyl)-6-methoxy-2-pyrazinemethanol, m.p. 74°–76°C.

EXAMPLE 11

α-(4-bromophenyl)-6-methoxy-α-propyl-α-pyrazinemethanol, m.p. 91°–94°C.

EXAMPLE 12

α-cyclopropyl-α-(4-methoxyphenyl)-6-methyl-2-pyrazinemethanol, m.p. 74°–78°C.

EXAMPLE 13

α-(2,4-dichlorophenyl)-3-methoxy-α-phenyl-2-pyrazinemethanol, m.p. 130°–132°C.

EXAMPLE 14

α-(2,4-dichlorophenyl)-3-dimethylamino-α-phenyl-2-pyrazinemethanol, oil

EXAMPLE 15

α-hexyl-6-methoxy-α-pentyl-2-pyrazinemethanol, oil

EXAMPLE 16

α-(2,4-dichlorophenyl)-6-methylthio-α-phenyl-2-pyrazinemethanol, glass

EXAMPLE 17

α-(2,4-dichlorophenyl)-6-methyl-α-phenyl-2-pyrazinemethanol, m.p. 53°–60°C.

EXAMPLE 18

α-(2,4-dichlorophenyl)-3-iodo-α-phenyl-2-pyrazinemethanol, m.p. 118°–120°C.

EXAMPLE 19

α-(2-fluorophenyl)-α-(3-fluorophenyl)-3-methyl-2-pyrazinemethanol, m.p. 94°–95°C.

EXAMPLE 20

α-(2,4-dichlorophenyl)-3-methyl-α-phenyl-2-pyrazinemethanol, m.p. 119°–119.5°C.

EXAMPLE 21

α-cyclopropyl-6-iodo-α-(4-methoxyphenyl)-2-pyrazinemethanol, m.p. 74°–76°C.

EXAMPLE 22

α-(2,4-dichlorophenyl)-3-methylthio-α-phenyl-2-pyrazinemethanol, m.p. 127°–130°C.

The compounds were tested against powdery mildew of bean, bean rust, rice blast, anthracnose of cucumber, and verticillium wilt of cotton. All of the diseases, except verticillium wilt, were artificially induced by inoculating the foliage of the test plants with the disease-causing organism. Verticillium wilt was induced by inoculating the roots of cotton plants with the organism. All of the test plants were young, greenhouse-grown plants of the species named.

Aqueous dispersions of the compound to be tested were prepared by dissolving the compound in acetone, ethanol or cyclohexanone, adding about 5 percent of an emulsifier comprising a blend of aryl sulfonates and nonionic surfactants, and dispersing the solution in water. The dispersions contained 400 ppm. by weight of the compound, except in the case of the bean rust tests, where the test compound was applied at 100 ppm. concentration.

The dispersion of test compound was sprayed on the foliage of the test plants. A sufficient amount of dispersion was applied to wet all the leaves of the plants on both the bottom and top surfaces. The plants were then inoculated with the disease-causing organisms, and the plants were set in the greenhouse until infected, untreated control plants with which the test plants were raised showed clear signs of the disease. The test plants were then evaluated on a 1–5 scale, on which 1 indicates severe disease, or no control of the disease, and 5 indicates complete control of the disease. The ratings 2, 3, and 4 indicate moderately severe, moderate, or slight disease, respectively.

The results observed when representative compounds of this invention were tested by the above method are shown below. The compounds are referred to by their example numbers which were used above.

| Example No. | Powdery Mildew | Bean Rust | Rice Blast | Anthracnose | Verticillium Wilt |
|---|---|---|---|---|---|
| 5 | 5 | 1 | 1 | 3+ | 1 |
| 7 | 3– | 1 | 1 | 1 | 1 |
| 8 | 5 | 1 | 4 | 1 | 1 |
| 9 | 5 | 1 | 1 | 1 | 1 |
| 10 | 1 | 1 | 1 | 3 | 1 |
| 11 | 5 | — | 3 | 1 | 1 |
| 12 | 1 | 1 | 1 | 3– | 1 |
| 13 | 5 | 1 | 1 | 1 | 1 |
| 14 | 5 | 1 | 1 | 1 | 1 |
| 15 | 5 | 1 | 3 | 3 | 1 |
| 16 | 5 | 1 | 3– | 1 | 1 |
| 17 | 5 | 1 | 2 | 1 | 1 |
| 18 | 5 | 1 | 1 | 1 | 4 |
| 19 | 1 | 1 | 3+ | 1 | 1 |
| 20 | 1 | 3– | 1 | 1 | 1 |
| 21 | 3 | 1 | 1 | 1 | 5 |
| 22 | 5 | 1 | 1 | 3– | 1 |

Other plant diseases are also controlled by the compounds of this invention. For example, *Botrytis cinerea*, which is the causative organism of botrytis disease of grapes, is effectively controlled by compounds of the invention, such as α-(2-chlorophenyl)-α-cyclohexyl-6-methoxy-2-pyrazinemethanol, α-cyclopropyl-α-(4-methoxyphenyl)-6-methylthio-2-pyrazinemethanol, and α-ethyl-α-(3-fluorophenyl)-6-methylthio-2-pyrazinemethanol.

The plant growth inhibition properties of the new compounds were evaluated in the following test. Soybean and chrysanthemum plants and bluegrass turf were grown in plastic pots in the greenhouse. The compound to be tested was dispersed in aqueous acetone with an emulsifier and was applied either to the plants or to the soil in which they grew. In the foliar sprayed tests, the dispersion of the compound was sprayed over the top of the plant with an air atomizing nozzle. The concentration of the dispersion of the foliar tests was either 100, 500, or 2500 parts per million. In the soil-applied tests, enough of the dispersion was applied to supply either 0.4, 2, or 10 lbs./A. of the test compound to the pot.

After application of the test compound, the treated plants were held in the greenhouse for 2 to 3 weeks. The plants were then observed, compared with untreated control plants, and rated on an arbitrary scale on which 0 indicates that the plants grew to the same extent as the untreated plants. If growth was inhibited, the extent of inhibition was indicated by a number between −1 and −3, where −3 indicates severe inhibition. Enhanced growth was similarly indicated by a number from +1 to +3.

Results of testing typical compounds appear below. The growth inhibition observed is recorded for each of the three plant species at each application rate. The application rates which are indicated as "ppm." are foliar-sprayed applications, and those indicated as "lbs./A." are soil-applied applications. The compounds are identified by their example numbers.

| Compound of Example No. | Rate | soybean | bluegrass | mum |
|---|---|---|---|---|
| 2 | 100 ppm. | 0 | 0 | 0 |

-continued

| Compound of Example No. | Rate | soybean | bluegrass | mum |
|---|---|---|---|---|
| | 500 | 0 | −2 | 0 |
| | 2500 | 0 | −3 | 0 |
| | .4 lb./A. | 0 | 0 | 0 |
| | 2 | 0 | −3 | 0 |
| | 10 | 0 | −3 | 0 |

| Compound of Example No. | Rate | soybean | bluegrass | mum |
|---|---|---|---|---|
| 4 | 100 ppm. | 0 | 0 | 0 |
| | 500 | 0 | 0 | 0 |
| | 2500 | 0 | 0 | 0 |
| | .4 lb./A. | 0 | −1 | 0 |
| | 2 | 0 | −1 | 0 |
| | 10 | 0 | −3 | 0 |

| Compound of Example No. | Rate | soybean | bluegrass | mum |
|---|---|---|---|---|
| 6 | 100 ppm. | 0 | 0 | 0 |
| | 500 | 0 | −2 | 0 |
| | 2500 | 0 | −2 | 0 |
| | .4 lb./A | 0 | −1 | 0 |
| | 2 | 0 | −2 | 0 |
| | 10 | 0 | −3 | 0 |

| Compound of Example No. | Rate | soybean | bluegrass | mum |
|---|---|---|---|---|
| 7 | 100 ppm. | 0 | 0 | 0 |
| | 500 | 0 | 0 | 0 |
| | 2500 | −1 | −2 | 0 |
| | .4 lb./A. | 0 | 0 | 0 |
| | 2 | 0 | 0 | 0 |
| | 10 | 0 | −3 | 0 |

| Compound of Example No. | Rate | soybean | bluegrass | mum |
|---|---|---|---|---|
| 8 | 100 ppm. | 0 | 0 | 0 |
| | 500 | −1 | 0 | 0 |
| | 2500 | −2 | 0 | 0 |
| | .4 lb./A. | 0 | 0 | 0 |
| | 2 | 0 | −2 | 0 |
| | 10 | 0 | −3 | 0 |

| Compound of Example No. | Rate | soybean | bluegrass | mum |
|---|---|---|---|---|
| 10 | 100 ppm. | −1 | 0 | 0 |
| | 500 | −1 | 0 | −1 |
| | 2500 | −2 | 0 | −3 |
| | .4 lb./A. | 0 | 0 | 0 |
| | 2 | 0 | −2 | −1 |
| | 10 | −3 | −3 | −2 |

| Compound of Example No. | Rate | soybean | bluegrass | mum |
|---|---|---|---|---|
| 11 | 100 ppm. | 0 | 0 | 0 |
| | 500 | 0 | 0 | 0 |
| | 2500 | 0 | −3 | 0 |
| | .4 lb./A. | 0 | 0 | 0 |
| | 2 | 0 | −1 | 0 |
| | 10 | 0 | −3 | 0 |

| Compound of Example No. | Rate | soybean | bluegrass | mum |
|---|---|---|---|---|
| 12 | 100 ppm. | 0 | 0 | 0 |
| | 500 | 0 | 0 | 0 |
| | 2500 | −2 | 0 | 0 |
| | .4 lb./A. | 0 | 0 | 0 |
| | 2 | 0 | 0 | 0 |

-continued

| Compound of Example No. | Rate | soybean | bluegrass | mum |
|---|---|---|---|---|
| | 10 | −3 | 0 | −2 |

| Compound of Example No. | Rate | soybean | bluegrass | mum |
|---|---|---|---|---|
| 17 | 100 ppm. | 0 | 0 | 0 |
| | 500 | 0 | 0 | 0 |
| | 2500 | 0 | 0 | 0 |
| | .4 lb./A. | 0 | 0 | 0 |
| | 2 | 0 | −1 | 0 |
| | 10 | 0 | −3 | 0 |

The compounds of the present invention are used for the control of plant diseases and for the regulation of plant growth by applying the compounds evenly to the foliage of the plants. The compounds may also be applied to the soil in which the plants grow, particularly when the compounds are used for growth regulation.

In general, the compounds are applied at rates in the range of from about 0.1 to about 10 lbs. of compound per acre. When the compounds are applied to the foliage, it is often convenient to measure the compounds by preparing formulations containing from about 25 to about 2500 ppm. by weight of the compound, and applying them to the foliage in quantities which thoroughly cover the leaves. Approximately equivalent application rates and results are obtained by measuring the compound in either way.

It is possible to apply the compounds in the pure state to the plants. It is usual in the agricultural chemical arts to prepare spray or dust formulations of compounds to be applied to plants. Sprayable formulations are preferred, because of the rapidity and economy of application, and because sprayed applications do not drift to untreated areas as much as dusts do. Granular formulations may be used when the compounds are to be applied to the soil.

The inert portions of agricultural chemical formulations and the methods of manufacture of them are well known and conventional in the agricultural chemicals art. Only a brief explanation of such formulations containing the compounds of this invention will therefore be given.

Dusts containing the compounds usually contain from about 0.1 to about 5 percent of the compound. Dusts are prepared by intimately mixing and finely grinding the compound with an inert solid such as ground montmorillonite clay, attapulgus clay, talc, ground volcanic rock, kaolin clay, or other inert, relatively dense, inexpensive substance.

The most convenient formulations are in the form of concentrated compositions to be applied by spraying as water dispersions or emulsions containing in the range from about 0.01 percent to about 5 percent of the compounds. Water-dispersible or emulsifiable compositions may be either solids usually known as wettable powders, or liquids usually known as emulsifiable concentrates.

A typical wettable powder comprises an intimate mixture of a compound of the invention, an inert carrier, and surfactants. The concentration of the active compound is usually from about 5 percent to about 90 percent by weight. The inert carrier is usually chosen from among the attapulgite clays, the montmorillonite clays, the diatomaceous earths, or the purified silicates. Effective surfactants, comprising from about 0.5 percent to about 10 percent of the wettable powder, are chosen from among the sulfonated lignins, the condensed napthalenesulfonates, the napthalenesulfonates, the alkylbenzenesulfonates, the alkyl sulfates and nonionic surfactants such as ethylene oxide adducts of phenol.

A typical emulsifiable concentrate comprises from about 0.1 to about 4 lbs. of a compound of the invention per gallon of liquid, dissolved in a mixture of organic solvents and emulsifiers. The organic solvent is chosen with regard to its solvency and its cost. Useful solvents include the aromatics, especially the xylenes, and the hydrophilic solvents such as the higher alcohols, glycols such as ethylene glycol, and the hydroxy ethers such as 2-ethoxyethanol. Other organic solvents may also be used, including the terpenic solvents such as rosin and turpentine derivatives. Suitable emulsifiers for emulsifiable concentrates are chosen from the same types used for wettable powders, and are used at similar percentages.

Solid, granular compositions are convenient for the application of compounds of this invention to the soil. Granules comprise a compound of the invention dispersed on a granular inert carrier such as coarsely ground clay of from about 0.1 to about 3 mm. particle size. The compound is most conveniently applied to the clay by dissolving it in an inexpensive solvent and applying the solution to the sized clay in an appropriate solids mixer.

The formulated compounds are applied to plants in the manners conventional in agricultural chemistry. Sprayable compositions are easily applied by any of many types of sprayers available to the art. Self-propelled, tractor-mounted, and towed spray devices which apply the water-dispersed formulations through calibrated atomizing nozzles are available and effective. Metering applicators are also available which can apply accurately measured quantities of granular compositions to the soil. The operator of the application equipment need only take care to adjust the equipment to apply an amount of the water-dispersed or granular formulation per acre which supplies the desired application rate of the compound, and to apply the amount uniformly to the plants to be treated.

I claim:
1. A compound of the formula

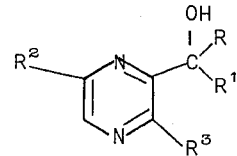

wherein
R represents $C_2$–$C_8$ alkyl, $C_3$–$C_8$ cycloalkyl, phenyl, or phenyl mono- or disubstituted with fluoro, chloro, bromo, methyl, ethyl, trifluoromethyl, or methoxy;
$R^1$ represents $C_2$–$C_8$ alkyl, phenyl, or phenyl mono- or disubstituted with fluoro, chloro, bromo, methyl, ethyl, trifluoromethyl, or methoxy;
$R^2$ represents hydrogen, iodo, methyl, ethyl, methoxy, or methylthio;
$R^3$ represents hydrogen, iodo, methyl, ethyl, methoxy, methylthio, or dimethylamino;
provided that either $R^2$ or $R^3$, but not both, represents hydrogen; and that both R and $R^1$ represent phenyl or substituted phenyl when $R^3$ represents a group other than hydrogen.

2. A compound of claim 1 which is α-(2-chlorophenyl)-α-cyclohexyl-6-methoxy-2-pyrazinemethanol.
3. A compound of claim 1 which is α-(2,4-dichlorophenyl)-6-methoxy-α-phenyl-2-pyrazinemethanol.
4. A compound of claim 1 which is α-(4-bromophenyl)-6-methoxy-α-propyl-2-pyrazinemethanol.
5. A compound of claim 1 which is α-(2,4-dichlorophenyl)-6-methyl-α-phenyl-2-pyrazinemethanol.
6. A compound of claim 1 which is α-(2,4-dichlorophenyl)-3-iodo-α-phenyl-2-pyrazinemethanol.

* * * * *